United States Patent [19]

Yamada

[11] Patent Number: 4,602,294
[45] Date of Patent: Jul. 22, 1986

[54] IMAGE REPRODUCING METHOD HAVING A RETOUCHING FUNCTION AND AN APPARATUS EMBODYING THE SAME

[75] Inventor: Mitsuhiko Yamada, Kyoto, Japan

[73] Assignee: Dainippon Screen Mfg. Co., Ltd., Kyoto, Japan

[21] Appl. No.: 500,087

[22] Filed: Jun. 1, 1983

[30] Foreign Application Priority Data

Jun. 1, 1982 [JP] Japan ................................. 57-94535

[51] Int. Cl.⁴ ......................... G03F 3/08; H04N 1/40
[52] U.S. Cl. ................................... 358/280; 358/80; 358/284; 364/518
[58] Field of Search ............... 358/80, 280, 284, 285; 364/518

[56] References Cited

U.S. PATENT DOCUMENTS

| | | | |
|---|---|---|---|
| 4,393,399 | 7/1983 | Gast et al. | 358/80 |
| 4,402,015 | 8/1983 | Yamada | 358/80 |
| 4,467,364 | 8/1984 | Konagaya | 358/80 |
| 4,476,487 | 10/1984 | Klie et al. | 358/80 |

FOREIGN PATENT DOCUMENTS

| | | |
|---|---|---|
| 90596 | 5/1983 | European Pat. Off. . |
| 8000070 | 11/1980 | PCT Int'Appl. . |
| 1422904 | 1/1976 | United Kingdom . |
| 2070381A | 10/1981 | United Kingdom . |
| 2006567B | 8/1982 | United Kingdom . |
| 2041691B | 1/1983 | United Kingdom . |

Primary Examiner—James J. Groody
Assistant Examiner—John K. Peng
Attorney, Agent, or Firm—Lowe Price Leblanc Becker & Shur

[57] ABSTRACT

The method of obtaining a reproduced printed picture such as a separated color film, without the necessity for modifications typically associated with a retouching work for such prints. In accordance with the invention, data signals representing quantity and area of retouching work are determined with the aid of a monitored picture which is obtained on a CRT screen through similar treatment as is done in a color scanner. The data signals are stored in a memory device, and are read out and added to recording signals of a color scanner to provide a composite recording signal which includes the desired retouching. Where the monitored picture represents a plurality of picture elements corresponding to data points stored in the memory device, data retrieved from the memory device is interpolated for presentation as the monitored picture. Interpolation may be linear, and is provided in two dimensions in order to provide a smoothed monitored image.

13 Claims, 15 Drawing Figures

IMAGE REPRODUCING METHOD HAVING A RETOUCHING FUNCTION AND AN APPARATUS EMBODYING THE SAME

FIELD OF THE INVENTION

This invention relates to image reproducing systems such as color or monochrome scanners, and particularly to systems which are capable of obtaining films for printing plates, and yet are freed from the necessity of performing dot-etching from an original picture.

BACKGROUND OF THE INVENTION

Color separated films of Y (yellow), M (magenta), C (cyan), and K (black) ink, used in a printing process, wherein black ink is used to control brightness, are typically made by using a color scanner. However, it is difficult to produce a perfect separated color film owing to the lack of manageability of a picture scanner for correcting variations in color and density in the field of color analysis. Furthermore, on occasion it is desired to produce a slightly different color tone from that of the original picture. Such a requirement also goes beyond the capability of prior art devices. In order to compensate for the insufficient functioning of the scanner, correction of color tones is usually done by using a reducer on some parts or on the full surface of the separated color film.

Conventional dot-etching is accomplished by placing a separated color film to be corrected on a retouching bench equipped with a light-table, applying a reducer liquid to the areas to be dot-etched, washing the liquid away with water, and observing the degree and effect of dot-etching on dot size with a magnifying glass. If necessary, the above procedures are repeated until the desired occupation ratio of dots, or dot percentage is obtained. When these procedures are applied to positive films, smaller dots will appear on the resultant print and when applied to negative films, larger dots will appear.

Though color scanners are popular today, the above described dot-etching and other retouching steps are still required thereby. These processes are rather time-consuming and troublesome, even for skilled workers.

SUMMARY OF THE INVENTION

It is, accordingly, an object of the present invention to overcome the difficulties involved in the aforesaid conventional retouching process.

It is a more specific object of the invention to obtain a method and system for realizing an image reproducing system free from dot-etching or other retouching work on separated color films by directly correcting signals obtained from a color scanner.

This invention is mainly characterized by the steps of displaying on a CRT screen a monitored picture identical to a final print to be produced using color signals representing red (R), green (G) and blue (B) components of light, obtained through an analyzing process in the same way as the actual Y, M, C, K separated color films are made, performing pre-retouching to determine the quantity and area of retouching upon the monitored picture, storing the data representative of the quantity and area into a memory and retrieving these data from the memory for addition to the separated color signals of Y, M, C and K obtained from the color scanner. Thereby a reproduced image, obtained on separated color films, for example, is free from the requirement for dot-etching and other retouching processes.

In addition, a smoothing treatment applied to step-like signals obtained in said steps of obtaining separated colors from the color scanner will produce a print having a more natural tone gradation.

BRIEF DESCRIPTION OF THE DRAWINGS

The present invention will become clearer from the following description of a preferred embodiment thereof with reference to the accompanying drawings, in which.

DESCRIPTION OF A PREFERRED EMBODIMENT

Figure 1:
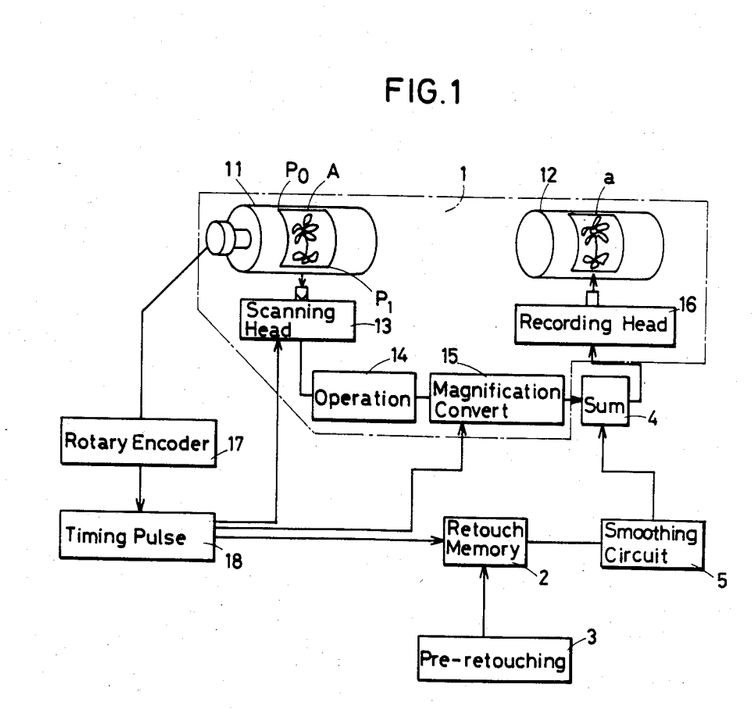
FIG. 1 is a block diagram, partly pictorial, showing a general concept of the present invention.

FIG. 1 is a schematic diagram to explain the principle of the invention. In FIG. 1, the portion 1 enclosed by a broken line shows an outline of a well-known color scanner, in which color component signals R, G and B, representing red, green and blue components of light as obtained from an original picture (A) on a picture drum 11 through a scanning head 13, undergo color correction, tone correction and other treatments in an analyzing circuit 14 and then undergo a magnification-conversion process in a magnification converter 15 before being output from a recording head 16 as separated color signals for recording pictures on color separated films (a) of Y, M, C and K placed on a recording drum 12.

A retouch memory 2 is loaded with data representative of quantity and area of dot-etching for each of the separated color films Y, M, C and K. These data are predetermined by a pre-retouching means 3 (described below). The data stored in the retouch memory are to be read in correspondence with the scanned signals of an original picture (described below) for addition to said scanned signals in a summing circuit 4 for performing retouching steps, such as dot-etching.

Figure 7:
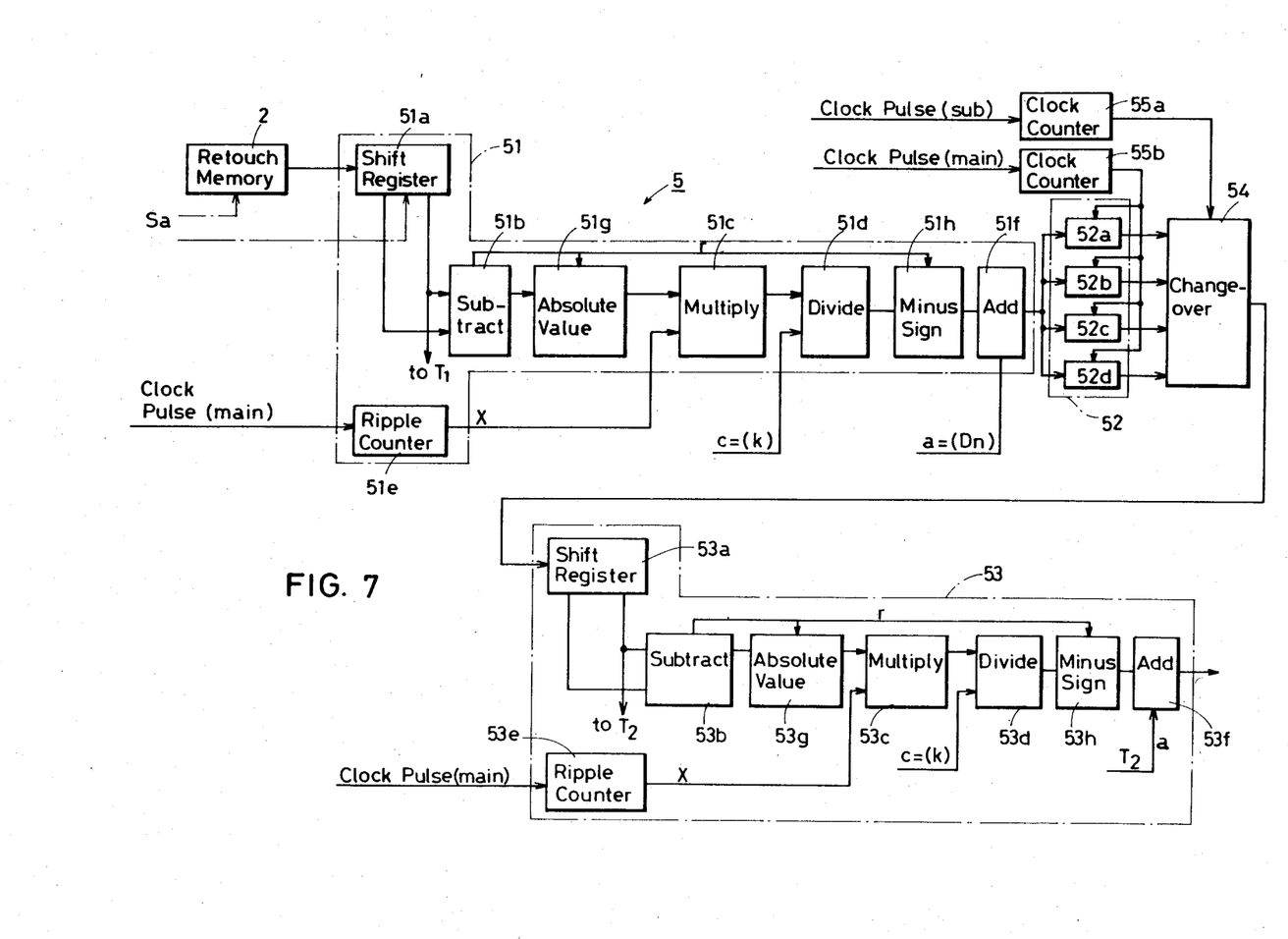
FIG. 7 is a block diagram of a typical smoothing circuit.

In accordance with the invention, a smoothing circuit is provided for smoothing the effects of retouching provided in the apparatus of FIG. 1. Interpolation between different dot-etching values at different points is provided to the summing circuit 4 by smoothing circuit 5, the details of which are shown at FIG. 7.

Figure 2:
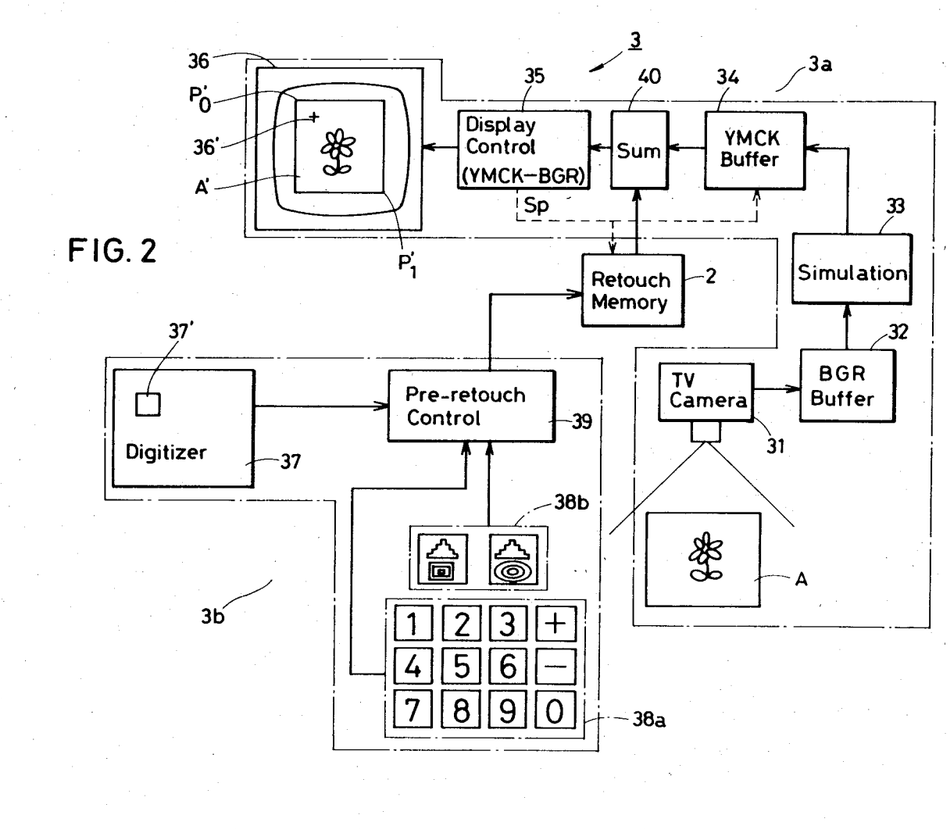
FIG. 2 is a block diagram, partly pictorial, showing a pre-retouching means.

FIG. 2 shows an arrangement for determining the quantity and area of dot-etching by using the pre-retouching means 3 comprising a monitoring device 3a and a setting device 3b. The monitoring device 3a is a device such as is disclosed in Japanese Patent Publication No. 54-38521 (Japanese Patent Application No. 47-84634) by the same applicant of this application, in which signals of primary color components R, G, and B obtained through scanning of the original picture (A), for example with a television camera, are temporarily stored in a buffer memory 32 and retrieved therefrom to be input to a simulation circuit 33, an electronic circuit equivalent to that of the color scanner 1. This simulation circuit 33 which undertakes color correction, density gradation correction and other compensations usually seen in a typical color scanner, is provided with the primary color component input signals R, G, and B. The simulation circuit converts these color component signals into separated color signals corresponding to films of Y, M, C and K, the separated color signals being stored temporarily in a YMCK buffer memory 34. The separated color signals Y, M, C and K are then retrieved from the buffer memory 34 and reconverted into secondary color component signals R, G and B in a display controlling circuit 35, which signals are viewed on a color CRT display device 36. The CRT 36 is provided for producing a color picture (monitored picture [A']) simulating the color tone of a final print to be obtained from the separated color films representing the original color picture (A).

Figure 3:
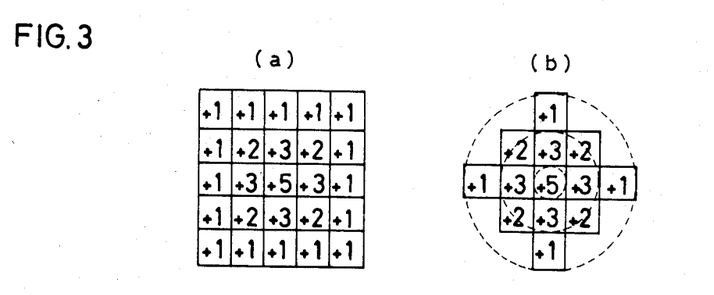
FIGS. 3(a), 3(b) show examples of retouching effect and pattern.

An operator will thereafter decide the quantity and area of dot-etching by watching the monitored picture (A') simulated on the color CRT display 36 by using the setting device 3b. More precisely, at first an operator will trace the desired area of dot-etching upon the monitored picture (A') by using a cursor (light pen) 37' of a digitizer 37 which controls spot 36' displayed on the color CRT display device 36 so that the spot 36' moves in accordance with the movement of the cursor 37'. Digitizer 37 thus enables an operator to designate the area with the cursor 37' while watching the color CRT display. Secondly, an operator will set quantity of dot-etching by inputting the desired dot percentage to a pre-retouch controlling circuit 39, such as a CPU, from a keyboard 38a. For the purpose of this procedure, if the dot-etching effect were exercised only at a point indicated by the spot 36' on the CRT display device 36, it would be necessary to trace all the points included in the area of dot-etching with the cursor 37'. To avoid this problem, the dot-etching effect may be exercised on a certain square or circular area around the point indicated by the spot 36' with appropriately decreasing density toward its periphery as shown in FIGS. 3(a) and 3(b). This effect pattern can be set with a pattern key 38b as the dot percentage is inputted. In a situation when dot-etching is performed several times in the above described manner, some points might be traced more than once or treated areas might overlap. But as the total achieved ratio is recorded, the ratio can be limited to a predetermined level if it is desired to control the same. The determined quantity and area of dot-etching are then given storage addresses corresponding to picture elements of the color CRT display by the pre-retouch controlling circuit 39 and finally stored in the retouch memory 2 for the separated colors Y, M, C and K. At the stage of pre-retouching, these data are brought to the color CRT display device 36 and their effects on the monitored picture (A') on the color CRT display device 36 are confirmed by the operator and, if necessary, the data are modified as desired.

Describing this more specifically, the data from the retouch memory 2 and data from the YMCK buffer memory 34 are retrieved synchronously with the aid of an address signal Sp corresponding to the scanning position of the color CRT display device 36 and, after being summed in a summing circuit 40, the data are converted into secondary color component signals of R, G, and B in the display controlling circuit 35. The secondary color component signals are used to generate a dot-etched monitored picture on the color CRT displaying device 36. Quantity data of dot-etching stored in retouch memory 2 (which data are, for example, six-bit data when the quantity of dot-etching has $\pm 10\%$ variability by 0.5% steps) is provided with a sign bit to indicate which type of etching, positive (for enlarging dots) or negative (for reducing dots) is to be done. If negative type of dot-etching is selected, an adder may be used for the summing circuit by outputting the data as the complement of the binary digits.

More precisely, in the process of retrieving the data of quantity and area of dot-etching from the retouch memory 2, these data are added to signals of primary color components from the color scanner 1 in a summing circuit 4 in FIG. 1 and these mixed signals in turn bring about dot-etched reproduced pictures.

At first the quantity and area data for the dot-etching must be retrieved from the retouch memory 2 and added synchronously to color separation signals from the color scanner 1 in such a way that the scanning position of the original picture (A) corresponds to the associated position on the monitored picture (A'). However, while the monitored picture (A') has fewer than 500 by 500 picture elements on the color CRT display device 36, the number of picture elements of the original picture (A) to be scanned by the color scanner 1 is greater than that of picture (A'), the relation between them being a constant k. This relation corresponds to the ratio of the number of picture elements between a beginning point of scanning $P_0'$ and an ending point of scanning $P_1'$ of the monitored picture (A'), to the number of picture elements between a beginning point of scanning $P_0$ and an ending point of scanning $P_1$ of the original picture (A) scanned by the color scanner 1, wherein $P_0'$ and $P_1'$ are arbitrary points on the monitored picture (A') which is so miniaturized that the whole original picture is displayed on the color CRT display device 36, and $P_0$ and $P_1$ are the points on the original picture drum 11 corresponding to $P_0'$ and $P_1'$, respectively. To provide perfect correspondence between these beginning and ending scan points on both the color scanner and the television camera, beginning point $P_0'$ and ending point $P_1'$ are at first determined on the color CRT display device 36 and then the points corresponding to the points $P_0'$ and $P_1'$ are located on the original picture on the drum 11 by means of a viewer on the scanning head 13 and given their absolute addresses using rotary encoder 17 and a linear encoder (not illustrated in the figure) on the scanning head. For instance, when quantity data of dot-etching and their addresses $(\alpha_1, \alpha_2, \ldots \alpha_n)$ in the retouch memory 2 are as shown in FIG. 4(a), the quantity signal of dot-etching will be added to picture signals to be reproduced by the color scanner 1 in such a way that one address of the retouch memory 2 corresponds to $K^2$ picture elements $(\beta_1, \beta_2, \ldots \beta_n)$ as shown in FIG. 4(b).

To achieve this, the timing by which the data from the retouch memory 2 are added to the separated color signals from the color scanner 1 in the summing circuit 4 in FIG. 1 is determined by an address signal Sa (described below) and the number of rotations of the recording drum. That is, as to the main-scanning direction, the data of dot-etching is read from retouch memory 2 synchronously with address signal Sa, which has been frequency divided in a timing pulse generator 18 by the value K. The data signals themselves were formed from pulse signals from rotary encoder 17, which is mechanically connected to the original picture drum 11. With respect to the sub-scanning direction, the data of dot-etching are read from retouch memory 2 synchronously with every K rotations of the drum 12, by using a pulse which is generated every one rotation of rotary encoder 17.

Figure 4:
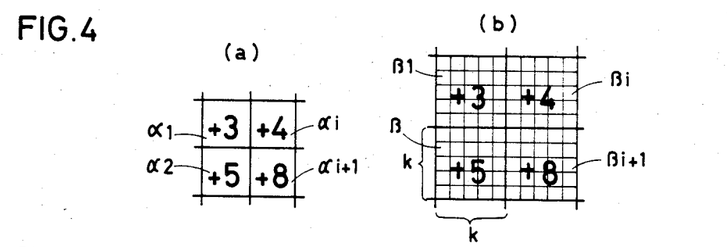
FIGS. 4(a), 4(b) show contents of a retouch memory and corresponding scanner outputs.

As can easily be understood from FIG. 4(b), such a dot-etching method will result in a stepped dot-etching effect on the reproduced picture. For this reason, some smoothing measures might be required. The following is a description of a preferred embodiment of this smoothing procedure.

Figure 5:
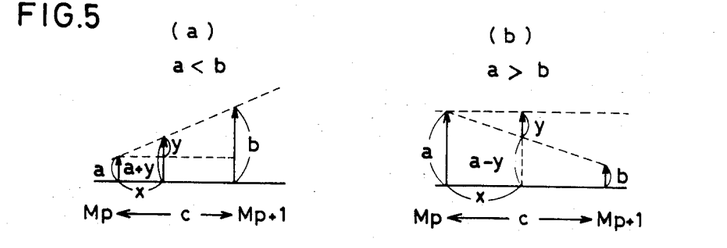
FIGS. 5(a), 5(b) are a graph to be referred to when describing the concept of smoothing.

Referring to FIGS. 5(a) and 5(b), an equation for linear interpolation between points $M_P$ and $M_{P+1}$ is given below.

$$y = x \cdot |b-a|/c \qquad (1)$$

where:
 a is a quantity of dot-etching at point $M_p$;
 b is a quantity of dot-etching at point $M_{P+1}$;
 c is the number of picture elements between points $M_p$ and $M_{P+1}$;
 x is the number of picture elements between point $M_p$ and an interpolation point; and
 y is the differential quantity of dot-etching between the interpolation point and point $M_P$.

Figure 6:
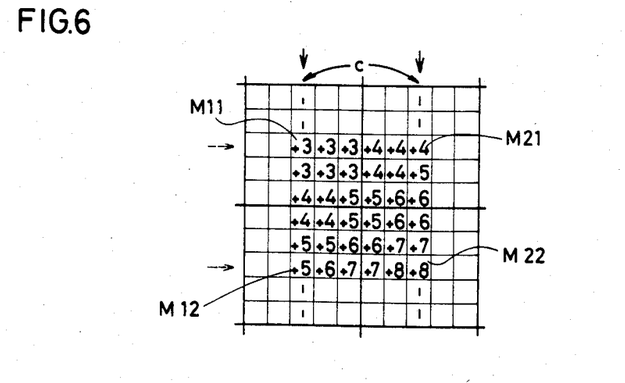
FIG. 6 shows an example of smoothing applied to the scanner outputs in FIG. 4(b)

FIG. 6 shows a case in which dot-etching signals undergo interpolation first of their main scanning direction factor (indicated by solid line arrows) and secondly of their sub-scanning direction factor (indicated by broken line arrows). The interpolation is between a point $M_P$ and $M_{P+1}$, each of which is in this case a center picture element of an optional one of picture elements group $(\beta_1, \beta_2, \ldots \beta_n)$.

More precisely, the actual degree of dot-etching is $a+y$ (for $a<b$) as is shown in FIG. 5(a), or $a-y$ (for $a>b$) as is shown in FIG. 5(b).

FIG. 7 shows a smoothing circuit 5, in which dot-etching signals undergo interpolation calculation of the scanning direction factor in a first operation device 51 and the calculated results are stored in a line memory 52 (52a ... 52d) and then undergo interpolation calculation of the sub-scanning direction factor in a second operation device 53. The signals are output after both interpolations.

More specifically, in a first operation device 51 every time an address signal Sa is input to the retouch memory 2, a quantity signal of dot-etching corresponding thereto and stored in the retouch memory 2 is successively transferred to a shift register 51a. In said shift register 51a, two adjacent quantity data ($D_n$, $D_{n+1}$) of dot-etching are stored, which data are transferred to subtracting circuit 51b when the address signal Sa is input to the retouch memory 2. A calculated result $D_{n+1} - D_n$ is output from subtracting circuit 51b. Furthermore, an absolute value circuit 51g, which is arranged to receive the output of the subtracting circuit 51b, judges whether the value of $D_{n+1} - D_n$, i.e., the value of $b-a$ in equation 1, is positive or negative. In the event that the value is negative, it is inverted in sign (that is, the output is changed to a value $|b-a|$) and finally input into a multiplying circuit 51c.

In the multiplying circuit 51c, the data corresponding to x ($x_1, x_2, \ldots x_P$) in the equation (1) are sent successively from a ripple counter 51e in synchronism with main scanning direction clock pulses from the rotary encoder to be received as $x_1(=1), x_2(=2) \ldots x_P(=4)$, which are then multiplied by the value $|b-a|$ from the subtracting circuit 51b, to obtain a value $x \cdot |b-a|$ of equation (1). The obtained value is then divided by c (the number of picture elements between points $M_P$ and $M_{P+1}$) in a dividing circuit 51d to obtain the value y in equation (1). Then minus sign attaching circuit 51h outputs the value y (for $D_{n+1} - D_n > 0$) or the value $-y$ (for $D_{n+1} - D_n < 0$) and an adding circuit 51f calculates $a+y$ and $a-y$. In this way interpolation between $M_P$ and $M_{P+1}$ is completed and after these calculations are repeated, interpolation for picture element lines $L_1, L_2, \ldots L_n$ of the main scanning direction is completed and the results thereof are stored in line memories 52.

The line memory 52 is composed of multiple line memory cells such as shift registers, each of which is capable of storing quantity data of dot-etching for picture elements of one main scanning line. In an embodiment shown in FIG. 7, calculated values for four lines are to be recorded.

Then in the second operation device 53, a similar interpolating calculation is performed on lateral lines $l_{11}, l_{12}, \ldots l_n$ which are located between lines $L_1$ and $L_2$ of the main scanning direction (as is shown in FIG. 8(b)) in a circuit including a shift register 53a, a subtracting circuit 53b, a multiplying circuit 53c, a ripple counter 53e, an adding circuit 53f, an absolute value circuit 53g, and a minus sign attaching circuit 53h and finally the value $a+y$ or $a-y$ is outputted to the summing circuit 4.

Figure 8:
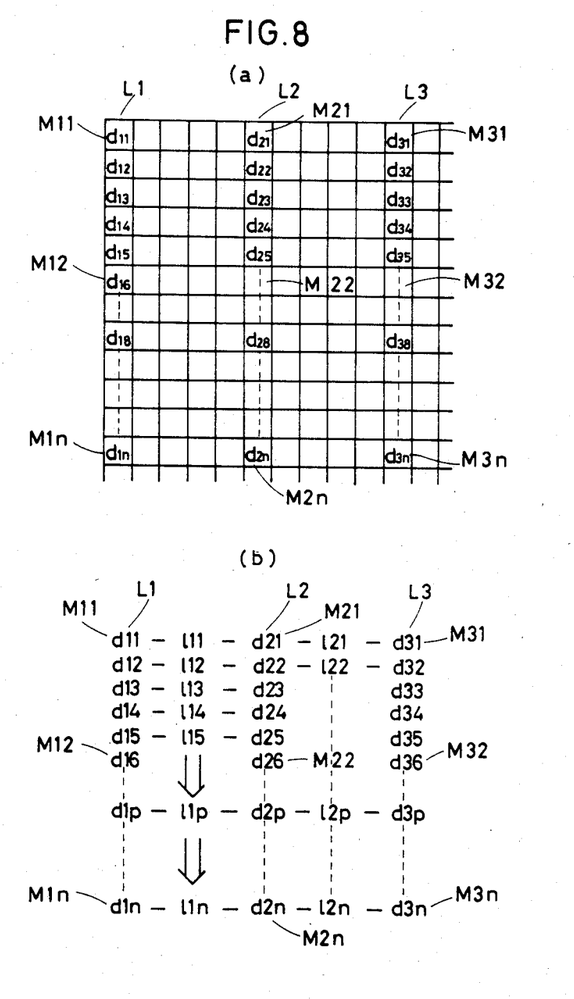
FIGS. 8(a), 8(b) are an explanatory drawing for smoothing procedures.

Describing operation of device 53 more precisely, the shift register 53a holds data of $L_P$ and $L_{P+1}$ on a sub-scanning direction line $l_{PP}$ (for example, data $d_{11}$ and $d_{21}$ on line $l_{11}$ in FIG. 8) and these data are sent to subtracting circuit 53b, in which a calculation of $|d_{21} - d_{11}|$ (corresponding to the value $|b-a|$ in the equation (1)) is performed, or the result being output to the multiplying circuit 53c. In the multiplying circuit 53c, x in the equation (1) is incremented by ripple counter 53e at each clock signal for sub-scanning direction and multiplied by the value $|b-a|$ to obtain the final output. The ripple counter 53e continuously counts from 1 to $\alpha$ (in the case of FIG. 8, $\alpha = 4$) and the data held in the shift register 53a are shifted by one, for example from $d_{11}, d_{21}$ to ($d_{12}, d_{22}$), at the command of main scanning direction clock counter 55b when all the calculations for the sub-scanning direction line $l_{PP}$ are completed.

After these calculations for up to line $l_{Pn}$ are finished, the shift register 53a proceeds to the next line and holds data $L_{P+1}$ and $L_{P+2}$ on a sub-scanning direction line between main scanning direction lines $L_2$ and $L_3$, and similarly carries out interpolation for this line.

Incidentally, it is noted that a data changeover circuit 54 is provided to changeover the cells of line memory 52a, 52b, 52c and 52d at each revolution of the original picture drum 11, which circuit functions so that while data of line memories 52a and 52b are called upon, data of line memories 52b and 52c are standing by for their turn.

Figure 10:
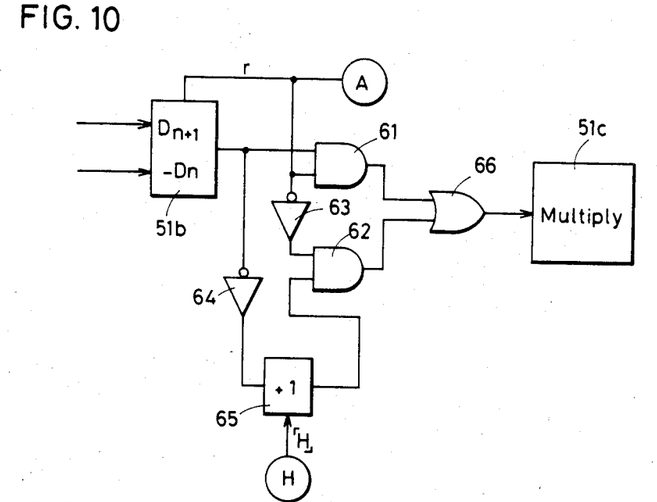
FIG. 10 is an embodiment of an absolute value circuit for use in the circuit of FIG. 7.

FIG. 10 shows a more detailed structure of the absolute value circuits 51g, 53g. That is, when the value b−a>0 in the subtracting circuit 51b or 53b, the most significant bit r becomes H to open an AND gate 61 and to output the value b−a itself through an OR gate 66 to a multiplying circuit. When the value b−a<0 in the subtracting circuit 51b or 53b, the bit r becomes L to close AND gate 61, so the signal b−a from the subtracting circuit 51b or 53b is inverted in inverter 64. At 65, the value of the output of the subtracting circuit is incremented by 1 and is outputted as a positive number through an AND gate 62, enabled by the L value of r, and OR gate 66 to a multiplying circuit As a result, the absolute value |b−a| is provided as an output to the multiplying circuit.

Figure 11:
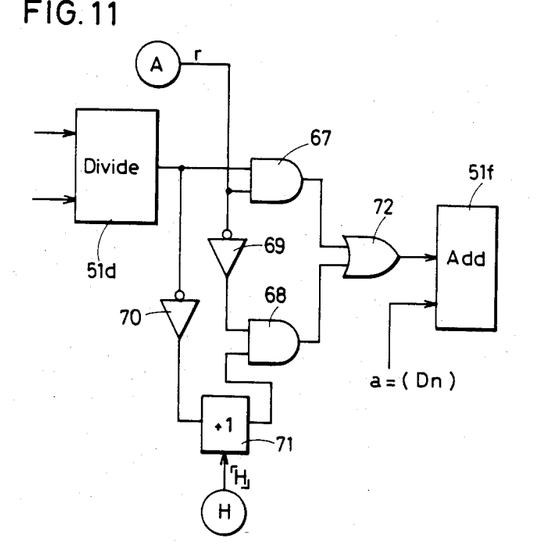
FIG. 11 is an embodiment of a minus sign attaching circuit for use in the circuit of FIG. 7.

FIG. 11 shows a more detailed structure of the minus sign attaching circuit 51h, 53h, which circuit opens an AND gate 67 when the value b−a>0 (the most significant bit r is H) in said subtracting circuit 51b or 53b, to output the value y itself from a dividing circuit 51d or 53d through an OR gate 72 to an adding circuit 51f or 53f, consequently causing a calculation a+y to be performed in the adding circuit 51f or 53f. When the value b−a<0 (the most significant bit r is L) in said subtracting circuit, the AND gate 67 is closed and said value y is inverted in an inverter 70. At 71 the value of the output of the divide circuit is incremented by 1 and is thus converted to become the value −y which is then output through an AND gate 68 (enabled by the L value of r) and OR gate 72 to an adding circuit. Consequently, a calculation a−y will be performed in the adding circuit 51f or 53f.

Figure 9:
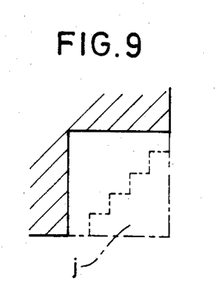
FIG. 9 shows another smoothing pattern.

The aforesaid is a description of a smoothing procedure which may be applied between two picture elements both of which are dot-etched. However, this smoothing procedure can be also applied in the same way between picture elements one of which is dot-etched (for example, the hatched area in FIG. 9) and the other of which is not dot-etched (for example, the area j in FIG. 9).

As thus described, the method and system of this invention will replace dot-etching or other retouching functions which have long been considered to be indispensable by watching on a color CRT display device a monitored picture, simulated by an electronic circuit having a function equivalent and similar to that of the operation circuit seen in a color scanner, and simulate dot-etching to conform the desired areas in the monitored picture to the desired quantity.

In addition, when the color scanner outputs include discrete step-like variations, a smoothing procedure is also available to obtain a print with more natural tone gradation.

Needless to say, the present invention can be also applied to monochrome scanners.

I claim:

1. An image reproducing method having a retouching function, comprising the steps of:
   (a) determining desired quantity and area of retouching which is obtained through simulation of an original picture under conditions substantially similar to those of a picture scanner device upon a monitored picture on a display device;
   (b) storing data representative of said quantity of retouching into memory cells of a memory device, at addresses corresponding to said area of retouching;
   (c) retrieving data of said quantity of retouching from particular memory cells synchronously with scanning signals representing elements of said original picture corresponding to said particular memory cells;
   (d) adding the retrived data to said scanning signals to produce recording signals for reproducing a retouched image; and
   (e) said adding step further comprising a smoothing step applied to said data retrieved from said memory device.

2. The method recited in claim 1 comprising the further step of displaying a plurality of picture elements upon said monitored picture in correspondence with a single data point stored in said memory device,
   said smoothing step comprising the further step of interpolating data between data points retrieved from said memory device for presentation as said plurality of picture elements upon said monitored picture.

3. An image reproducing system having a retouching function, comprising:
   (a) a pre-retouch means comprising a monitoring means for simulating an original picture as a monitored picture thereon, with an electronic circut means having a function equivalent to that of an operation circuit of a picture scanner and a setting means for designating desired data of quantity and area of retouching upon said monitored picture;
   (b) a memory means for storing the data of said quantity and area of retouching designated by said pre-retouch means;
   (c) a summing means for adding contents of said memory means to recording signals of said electronic circuit means so that contents of said memory device correspond to position in said original picture and said monitored picture; and
   (d) a smoothing circuit means connected to said summing means for smoothing quantity of retouching data provided thereto.

4. In an image reproducing system including color scanning means for obtaining color component signals R, G and B, representing an original image, and color separation signals Y, M, C and K for producing color separation films, the improvement comprising:
   pre-retouching means for producing correction signals for said signals produced in said color scanning means,
   memory means for storing said correction signals,
   timing means for reading out the stored correction signals in synchronism with the signals provided by said color scanning means for corresponding elements of the original image,
   means for combining said readout stored correction signals with said signals provided by said color scanning means and for producing a combined output signal to drive a recording head for producing a retouched color separation film, and smoothing means for interpolating dot-etching signal data for display on a display intermediate data points stored in said memory means,
   said smoothing means connected for receiving retouching data from said memory means and for providing smoothed data signals to said summing means.

5. An image reproducing system as recited in claim 4 wherein said pre-retouching means includes:

a monitoring means including second color scanning means for producing simulated color separation signals;

further combining means for combining said simulated color separation signals with said stored correction signals to produce further combined output signals, means for converting said further combined output signals to secondary decomposed color signals to drive a color display monitor to simulate color tones of prints to be obtained from said color separation films representing the original image, and a setting means for entering correction signals into said memory means, whereby corrections of said color separation films may be manipulated by said setting means and viewed on said color display monitor by provision of correction data to said memory means.

6. A method for reproducing images on a photosensitive material by scanning an original with a first scanning means to obtain image data and summing up said image data together with previously determined data representative of quantity and area of retouching comprising the steps of:

(a) scanning the original with a second scanning means to obtain further image data;

(b) simulating the original as a monitored picture on a monitoring means using said further image data obtained in step (a);

(c) determining data representative of area and quantity of retouching by means of a setting means referring said monitored picture to corresponding addresses of a memory means;

(d) storing said data representative of area and quantity of retouching in said memory means;

(e) scanning the original with the first scanning means to obtain image data of smaller picture elements than those of which said further image data is obtained in step (a);

(f) retrieving said data representative of area and quantity of retouching, in synchronization with the scanning of step (e), from the corresponding address in the memory; and (g) summing up image data obtained in step (e) and said data representative of area and quantity of retouching retrieved in step (f).

7. The method claimed in claim 6, wherein said determining step (c) comprises the further step of providing, to multiple picture elements around a specified picture element of said monitored picture to be retouched, data of quantity of retouching which decrease gradually toward the periphery of said multiple picture elements.

8. An image reproducing system for reproducing images on a photosensitive material by scanning an original, comprising:

(a) a first scanning means for scanning the original to obtain image data;

(b) a second scanning means for scanning the original to obtain further image data of larger picture elements than those of which image data is obtained by said first scanning means;

(c) a monitoring means for simulating the original as a monitored picture thereon on the basis of said further image data obtained by said second scanning means;

(d) a setting means for designating data representing desired quantity and area of retouching upon said monitored picture;

(e) a memory means for storing the data representing said quantity and area of retouching designated by said setting means; and (f) a summing means for adding said data representative of quantity and area of retouching, which is retrieved from said memory means in synchronization with the scanning of said first scanning means, to image data obtained by said first scanning means.

9. The system claimed in claim 8 wherein said setting means comprises a digitizer means to designate said area of retouching and a keyboard means for designating said quantity of retouching.

10. The system claimed in claim 8 wherein said monitoring means includes means for displaying a plurality of image points corresponding to each data point stored in said memory means, and further comprising smoothing means for interpolating dot-etching signal data for display on a plurality of display points of said monitoring means intermediate data points stored in said memory means, said smoothing means connected for receiving retouching data from said memory means and for providing smoothed data signals to said summing means.

11. The system claimed in claim 10 wherein said smoothing means comprises means for linearly interpolating data between successive points represented in said memory means, said means for linearly interpolating operable for interpolating dot-etching signal data in two dimensions.

12. The system claimed in claim 11 wherein said means for linearly interpolating comprises subtracting means for obtaining a difference between dot-etching signal data for two points;

absolute value means for providing a signal representative of an absolute value of the difference obtained by said subtracting means;

multiplying means for multiplying the absolute value provided by said absolute value means by the number of picture elements between one of said points in said memory means and an interpolation point;

dividing means for dividing the product provided by said multiplying means by the total number of picture elements between said two successive points;

sign correcting means for providing the proper sign to an output of said dividing means; and adding means for adding to the sign corrected output of said dividing means a quantity of dot etching corresponding to one of said two points.

13. The system claimed in claim 12 further comprising a plurality of line memory means for storing dot-etching quantity data for picture elements of a plurality of scanning lines.

* * * * *